April 2, 1929.  L. G. ROLLER  1,707,572
VALVE GRINDER
Filed March 2, 1927
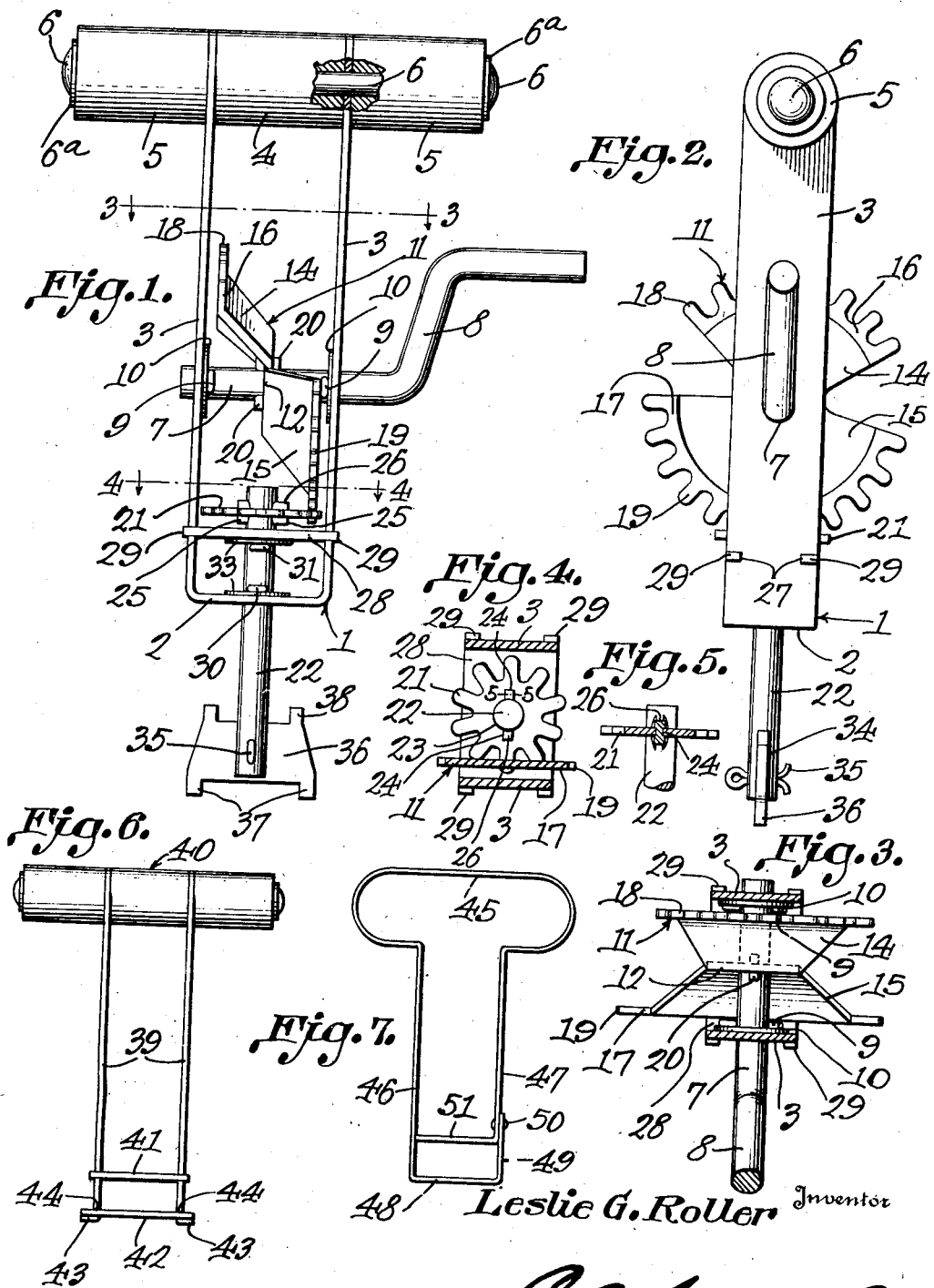
Leslie G. Roller, Inventor Patented Apr. 2, 1929.

1,707,572

UNITED STATES PATENT OFFICE.

LESLIE G. ROLLER, OF CEDAR RAPIDS, IOWA.

VALVE GRINDER.

Application filed March 2, 1927. Serial No. 172,075.

This invention aims to provide a valve grinder which can be turned out cheaply from stampings, for the most part.

Figure 1 shows in elevation, a device constructed in accordance with the invention;

Figure 2 is a side elevation;

Figure 3 is a section on the line 3—3 of Figure 1;

Figure 4 is a section on the line 4—4 of Figure 1;

Figure 5 is a section on the line 5—5 of Figure 4; and

Figures 6 and 7 are elevations showing modifications in the handle.

In Figures 1 and 2 there is shown a U-shaped frame 1 made of sheet metal and including a base 2 and side arms 3 disposed at right angles to the base 2. Between the upper ends of the side arms 3 is located a spacer block 4 generally made of wood. Outer blocks 5 are disposed against the outer sides of the arms 3. The blocks 5, like the block 4, may be made of wood. A securing device 6, such as a rivet, passes through the outer blocks 5, the side arms 3, and the spacer block 4, the ends of the securing element 6 being riveted down on washers 6ᵃ at the outer ends of the blocks 5. The blocks 4 and 5 form a handle on the frame 1.

A shaft 7 is journaled in the side arms 3 and has a crank 8. There are cotter pins 9 in the crank 8, inside of the arms 3, and washers 10 are located on the shaft 7 between the cotter pins 9 and the side arms 3. The function of the cotter pins 9 is to prevent the shaft 7 from moving endwise. The numeral 11 marks a gear wheel fashioned from sheet metal of a common thickness throughout, and comprising a central disk 12 and oppositely inclined hollow arms 14 and 15 projecting from the periphery of the disk 12, the arm 14 having a flange 16, and the arm 15 having a flange 17, the flanges 16 and 17 being parallel. The flange 16 has a marginal gear 18, and the flange 17 has a marginal gear 19. Teeth in the gears 18 and 19 are of the same size, but there are more teeth in the gear 19 than there are in the gear 18. The shaft 7 passes through the disk-like hub 12 of the gear 11. The means whereby the gear wheel 11 is fastened to the shaft 7 is denoted by the numeral 20, but is not described at length at this point, because the construction of the means shown at 20 can be described better at a subsequent point in this specification.

The teeth of the gears 19 and 18 on the wheel mesh into opposite portions of a pinion 21, made of sheet metal of a common thickness throughout and mounted on a shaft 22 disposed at right angles to the shaft 7. The pinion 21 has an opening 23 to receive the shaft 22, and on each side of the opening 23, and communicating therewith, there are radial slots 24. The constituent material of the shaft 22 is pressed or manipulated otherwise to form integral ribs 25 that are received in the slots 24 of the pinion 21, the ribs 25 being riveted out, as at 26, to engage opposite surfaces of the pinion 21. The pinion 21 is attached to the shaft 22, thus, by a simple pressing operation. It may now be stated that the means 20 for securing the gear wheel 11 to the shaft 7 is the same as the means above described for securing the pinion 21 to the shaft 22.

The side arms 3 of the frame 1 are provided in their opposite edges with notches 27. A bearing plate 28 is located between the arms 3 and is supplied at its corners with lugs 29 which, being received in the notches 27, hold the bearing plate on the arms 3. The shaft 22 is journaled in the bearing plate 28 and also in the bottom or base 2 of the frame 1. Cotter pins 30 and 31 are inserted in the shaft 22 between the base 2 and the bearing plate 28. Washers 33 are introduced between the cotter pin 31 and the bearing plate 28, and between the cotter pin 30 and the base 2 of the frame 1. In the lower end of the shaft 22 there is a slot 34, across which extends a cotter pin 35, mounted in the shaft 22. The cotter pin 35 retains in the slot 34, a valve-engaging member 36, in the form of a plate, provided on one edge with lugs 37, and on its opposite edge with lugs 38, the plate itself being designated by the numeral 36. The lugs 37 and 38 are adapted to be engaged with openings in a valve during the rotation of the valve to grind it, an operation which is well understood by those who have anything to do with internal combustion engines. The lugs 37 are spaced more widely apart than are the lugs 38, and by inverting the plate 36 from the position shown in Figure 1, the lugs 38 may be used instead of the lugs 37, the device, thus, being adapted to valves the openings in which are spaced at different distances apart.

The operation of a device of the class described is well known, but it may be stated briefly that by means of the crank 8 and the shaft 7, the gear wheel 11 may be rotated, the gears 18 and 19 thereof cooperating with the pinion 21 to impart oscillating rotation to the shaft 22 and the valve-engaging member 36.

The frame 1 may be stamped out at trifling cost, and the same observation may be made with respect to the bearing plate 28, the pinion 21 and the gear wheel 11. Moreover, the gear wheel 11 may be attached to the shaft 7, and the pinion 21 may be attached to the shaft 22, by a simple pressing operation.

The tool forming the subject matter of this application has been brought within practical limits, and may be turned out at a trifling expense, with a minimum amount of expenditure both for labor and for material. The gear wheel 11, owing to its particular construction, and the way in which it is assembled with the shaft 7, will possess great strength, and be well adapted to withstand severe use.

In Figure 6, the frame is made up of parallel strips 39, corresponding to the side arms 3, of Figure 1. The strips 39 are assembled at their upper ends with a handle 40 which is made like the handle 6—5—4 of Figure 1. The bearing plate 41 is constructed like the bearing plate 28 and is located above a bottom plate 42, corresponding in function to the base 2 of Figure 1, the bottom plate thus having openings for reduced fingers 43 on the lower ends of the strips 39, the fingers 43 forming shoulders 44, and the fingers being turned over against the lower surface of the plate 42 to hold it against the shoulders 44.

In Figure 7, the handle is of one-piece construction and is made out of a single piece of metal formed into a loop-shaped grip 45, which is extended to form parallel arms 46 and 47, the arm 46 being prolonged laterally to form the bottom piece 48, the bottom piece 48 being extended to form a fashion 49 secured thereto by a rivet 50 or the like to the arm 47, the lower end of the arm 47 being extended, parallel to the bottom piece 48, to form a bearing plate 51 that bears against the arm 46. The bottom piece 48 corresponds in function to the base 2, and the bearing plate 51 corresponds in function to the bearing plate 28, the driving and operating mechanism shown in Figure 1 being used in connection with the form shown in Figure 7, or in connection with the form shown in Figure 6.

What is claimed is:—

A gear wheel fashioned from sheet metal of a common thickness throughout, and of such a thickness that the gear wheel can be stamped from it, the gear wheel comprising a central disc and oppositely inclined concaved arms projecting from the periphery of the disc, each arm being provided at its outer edge with a flange having teeth, the teeth being located in the same plane with the flanges, the flanges being parallel to each other and to the disc.

In testimony that I claim the foregoing as my own, I have hereto affixed my signature.

LESLIE G. ROLLER.